United States Patent [19]

Yamamoto

[11] 4,417,504
[45] Nov. 29, 1983

[54] REGULAR COFFEE SET

[75] Inventor: Noboru Yamamoto, Yokohama, Japan

[73] Assignee: Mitsumoto Coffee Co., Ltd., Japan

[21] Appl. No.: 250,397

[22] Filed: Apr. 2, 1981

[51] Int. Cl.³ .............................................. A47J 31/02
[52] U.S. Cl. ..................................... 99/306; 206/0.5; 206/217; 206/218; 220/212; 210/474; 426/77; 426/86; 426/115
[58] Field of Search .................. 210/473, 474; 426/77, 426/86, 115, 112, 120, 394, 433; 206/217, 0.5, 218; 99/290, 295, 306, 316, 304, 296, 317; 220/212

[56] References Cited

U.S. PATENT DOCUMENTS

| 956,332 | 4/1910 | Fuller | 210/474 |
|---|---|---|---|
| 1,160,924 | 11/1915 | Mangisch et al. | 99/306 |
| 1,202,642 | 10/1916 | Allen | 206/217 |
| 2,328,543 | 9/1943 | Bauman | 206/217 |
| 2,716,937 | 9/1955 | Milano | 99/295 |
| 2,743,664 | 5/1956 | Dale | 426/86 |
| 2,794,545 | 6/1957 | Olson | 206/217 |
| 3,080,810 | 3/1963 | Saint | 99/306 |
| 3,166,003 | 1/1965 | Merson | 210/474 |
| 3,227,273 | 1/1966 | Syverson et al. | 206/217 |
| 3,334,574 | 8/1967 | Douglas | 210/474 |
| 3,389,650 | 6/1968 | Michielsen | 99/295 |
| 3,526,313 | 9/1970 | Kull et al. | 206/217 |
| 3,615,708 | 10/1971 | Abile-gal | 210/474 |
| 3,811,373 | 5/1974 | Telco | 426/77 |
| 4,069,751 | 1/1978 | Gronwick | 99/306 |
| 4,167,136 | 9/1979 | Chupurdy | 99/306 |
| 4,221,670 | 9/1980 | Ziemek | 210/474 |
| 4,231,476 | 11/1980 | Compton et al. | 206/217 |

FOREIGN PATENT DOCUMENTS

| 2607605 | 9/1977 | Fed. Rep. of Germany | 99/317 |
|---|---|---|---|
| 25730 | of 1914 | United Kingdom | 210/282 |

Primary Examiner—Steven L. Weinstein

[57] ABSTRACT

This invention relates to a regular coffee set which is simple to use and portable. It comprises a dripper body of approximately conical shape having an opening on its bottom, a cylindrical case having an opening corresponding to the above opening and a coffee cup to be fitted for a lowermost periphery of the cylindrical case. There is formed a heat insulating space between the dripper body and the cylindrical case. The dripper body is provided at its nearly whole side with a plurality of grooves and the lowermost periphery of the cylindrical case is provided with a corrugated portion so as to be well-fitted for an uppermost periphery of the coffee cup. By inserting the dripper body into the cylindrical case, a dripping container is formed and placed upon the coffee cup.

1 Claim, 6 Drawing Figures

REGULAR COFFEE SET

BACKGROUND OF THE INVENTION

This invention relates to a regular coffee set which is simple to use.

Usually, it is difficult to prepare a non-instant regular coffee outdoors, e.g. in a place where one might go on excursion or the like. Those who wish to drink a non-instant regular coffee in such an outdoor place must prepare a special dripping device, but this is burdensome to carry and handle. Today, various kinds of drippers are being placed on the market, but each of them is not suitable for handling outdoors.

In view of the above disadvantages, this invention has been attained.

BRIEF SUMMARY OF THE INVENTION

An object of this invention is to provide a regular coffee set which is simple to use and portable anywhere.

The regular coffee set comprises a dripper body of approximately conical shape having an opening on its bottom, a cylindrical case having an opening corresponding to the above opening and a coffee cup to be fitted for a lowermost periphery of the cylindrical case. The cylindrical case is provided at its lowermost periphery with a corrugated portion to be well-fitted for an uppermost periphery of the coffee cup. By inserting the dripper body into the cylindrical case, a dripping container is formed and placed upon the coffee cup.

Another object of this invention is to provide a regular coffee set in which the dripping container having both a dripper body and a cylindrical case is inverted up-to-down and placed upon the coffee cup, thus a space being formed between the inverted dripping container and the coffee cup in order to incorporate therein at least a powdered regular coffee pack, a powdered milk pack, a sugar pack and a plastic spoon.

Other and further objects, features and advantages of this invention will become apparent from the following description taken in connection with the accompanying drawings.

DETAILED DESCRIPTION OF THE INVENTION

Figure 1A:
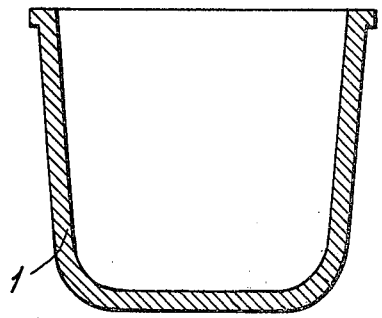
FIG. 1A is a section view of a coffee cup which is used in a regular coffee set according to this invention.
Figure 1B:
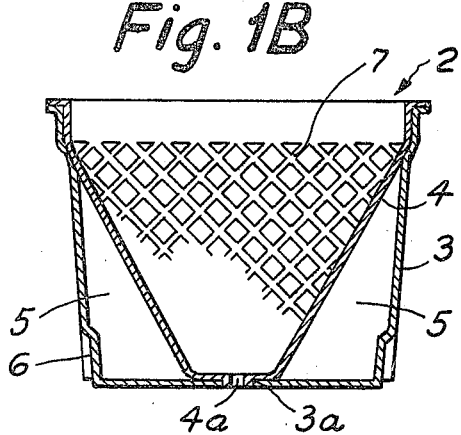
FIG. 1B is a section view of a dripping container which is used in the regular coffee set according to this invention.

Preferred examples of this invention will now be described with reference to the accompanying drawings.

First of all, the term "Regular Coffee" in this invention means a real coffee powder which is obtained by grinding coffee beans.

Numeral 1 is a water-proof coffee cup which is made of a preferred synthetic resin such as foamed styrol or a water-proof paper. Numeral 2 is a dripping container comprising an outer cylindrical case 3 including a small opening 3a formed at its bottom, a dripping body 4 and a heat insulation area 5 formed between an interior of the outer case 3 and an exterior of the dripping body 4.

The dripping body 4 has also a small opening 4a so as to correspond to the opening 3a of the outer case 3. At a lower periphery of the outer case 3 there is formed a recessed corrugated portion 6 fittable into an upper periphery of the coffee cup. Accordingly, a diameter of the outer case 3 at its lowest part is nearly equal to an opening diameter of the coffee cup 1. The dripping body 4 is of a triangular shape at section. An inner surface of the dripping body 4 is provided with a grooved portion 7 of a lattice form in order to expedite filtering of coffee powder. The grooved portion 7 may have a number of vertical grooves.

Figure 2:
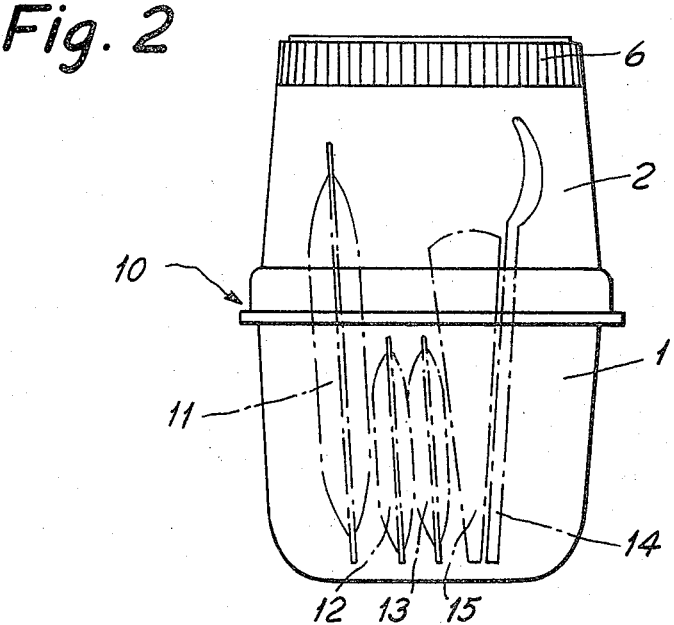
FIG. 2 is a front view of an example, in which the dripping container is inverted and placed on the coffee cup.

As shown in FIG. 2, the dripping container 2 is inverted and mounted upon the coffee cup 1. In a space formed between the inverted dripping container 2 and the coffee cup 1 there are incorporated a powdered regular (non-instant) coffee pack 11, a powdered milk pack 12, a sugar pack 13, a spoon 14 and a paper filter 15 for filtering the powdered regular coffee. The powdered regular coffee and milk are stored in e.g. a vacuum aluminum foil pack.

A usage of the regular coffee set according to this invention will now be described.

Figure 3:
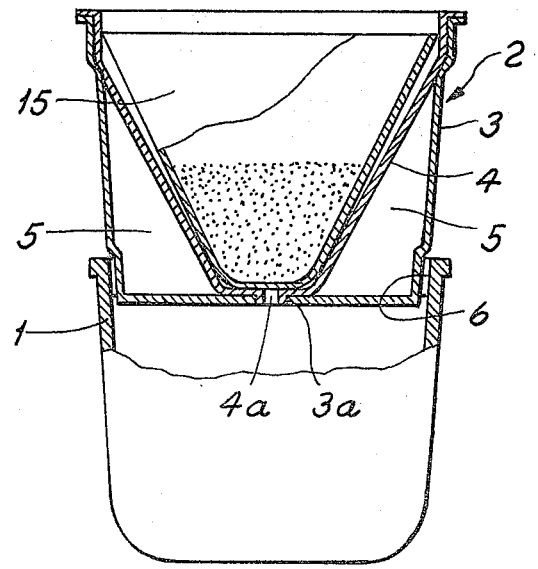
FIG. 3 is a partially cutaway section view of a use condition of the regular coffee set according to this invention.

As shown in FIG. 3, the dripping container 2 is mounted on the coffee cup 1.

Since the dripping container 2 is provided, at its lower part, with corrugations on recessed portion 6, it is resilient to some extent and easily fitted to an upper circumference of the cup 1.

Next, one paper filter 15 is set within the dripping body 4 and a coffee powder packed within the sealed regular coffee pack 11 is placed upon the paper filter 15. After the coffee powder has been flattened somewhat, a quantity of boiled water is poured slowly into the coffee powder. The coffee filtered by the paper filter 15 is passed through the opening 4a of the dripping body 4 as well as through the opening 3a of outer case 3 and is stored in the coffee cup 1. Then, a powdered milk and sugar are added to it and mixed by the spoon 14. Thus, regular coffee is obtained easily.

Figure 4:
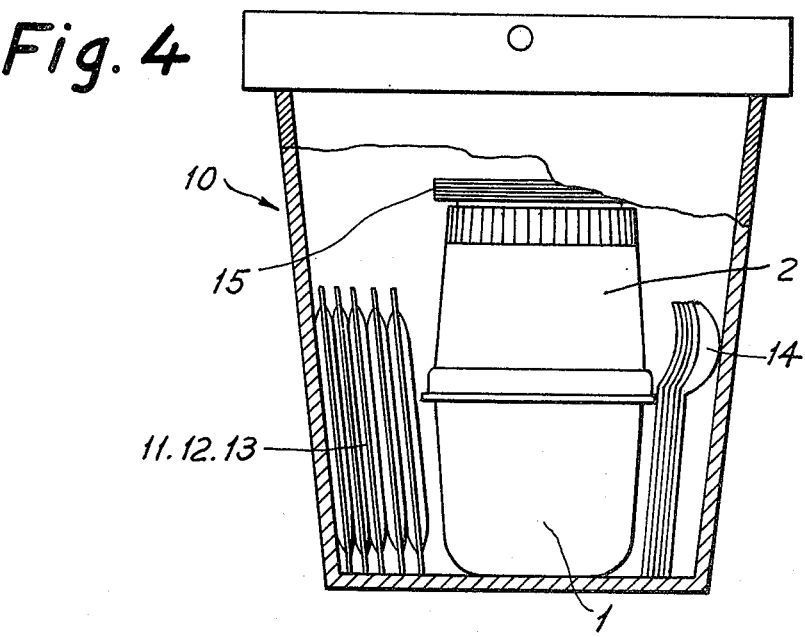
FIG. 4 is a view, in which the regular coffee set and other materials for drinking a regular coffee are incorporated in a plastic bag.

FIG. 4 shows an example in which the regular coffee set according to this invention and various materials for drinking a regular coffee are stored in a plastic bag 10. The plastic bag 10 is preferably made of a polyethylene or polypropylene film.

Figure 5:
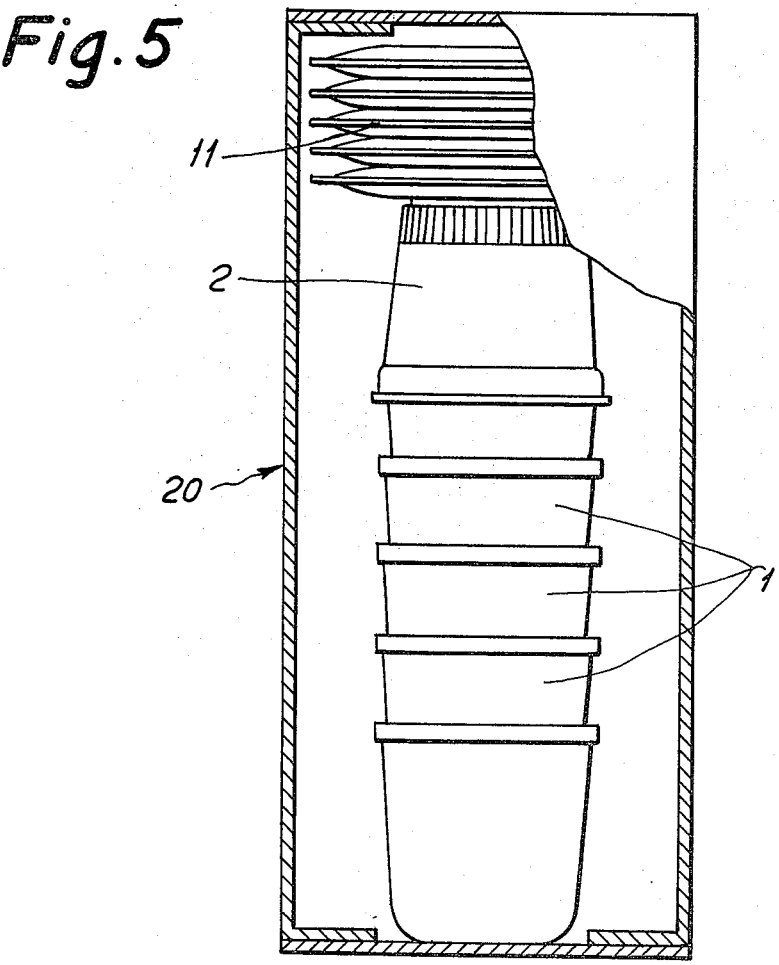
FIG. 5 is a view, in which the regular coffee set and other materials for drinking a regular coffee are incorporated in a paper case.

FIG. 5 shows another example of packing, in which the regular coffee set and other materials are stored in a paper case 20. As shown in FIG. 5, five coffee cups 1 are piled one above another, and the up-to-down inverted dripping container 2 is placed upon the uppermost cup 1. This paper case is prepared for five persons and various materials may be stored therein, so that five persons can drink the regular coffee.

According to one aspect of this invention, since a preferred number of the dripping containers and other materials may be incorporated in the paper case or the plastic bag, it is convenient to carry it when going on an excursion. Further, all the used devices and materials may be stored again therein. Accordingly, it is possible to put the regular coffee set in order without throwing it away.

What is claimed is:

1. A regular coffee set, comprising:
   a coffee cup having an open top, said open top having an inside diameter and an outside diameter;
   a dripping container including an outer case and a dripping body spaced from said outer case to define a heat insulation area therebetween;
   said outer case being generally cylindrical and having an open top and a first opening centrally disposed in its bottom;
   said dripping body being fittable inside said outer case and having a generally conical cross sectional shape, an open top and a second opening centrally disposed in its bottom, said second opening being aligned with said first opening;
   a plurality of grooves on said dripping body effective for expediting filtering a coffee through a filter placed within said dripping body;
   an outside diameter of a bottom of said outer case being supportably fittable into said inside diameter of said open top of said coffee cup;
   means on said outside diameter of said bottom of said outer case effective to impart resiliency to said outer diameter for easy fitting into said inside diameter of said open top of said coffee cup;
   an inside of a top of said dripping container having a diameter for fitting top to top over said outside diameter of said coffee cup to function as a cap and to form a volume therein for containing supplies.

* * * * *